United States Patent [19]

Asada

[11] Patent Number: 5,794,503
[45] Date of Patent: Aug. 18, 1998

[54] DISC CUTTER

[75] Inventor: Tanehiko Asada, Shizuoka-ken, Japan

[73] Assignee: Tenryu Seikyo Kabushiki Kaisha, Shizuoka-ken, Japan

[21] Appl. No.: 669,824

[22] Filed: Jun. 26, 1996

Related U.S. Application Data

[63] Continuation of Ser. No. 361,211, Dec. 21, 1994, abandoned.

Foreign Application Priority Data

Aug. 26, 1994 [JP] Japan ................................. 6-225943

[51] Int. Cl.⁶ .......................... B23D 61/02; B27B 33/08
[52] U.S. Cl. ........................ 83/835; 83/839; 83/852; 83/676
[58] Field of Search ................... 83/835, 839, 840, 83/852, 854, 855, 676

References Cited

U.S. PATENT DOCUMENTS 3,154,839  11/1964  Kleber, Jr. et al. .................. 83/835
3,261,384   7/1966  Henderson ............................. 83/839

FOREIGN PATENT DOCUMENTS

| 60-125828 | 8/1985  | Japan . |
| 60-194419 | 12/1985 | Japan . |
| 39113     | 2/1987  | Japan ............................. 83/835 |
| 63-197101 | 12/1988 | Japan . |
| 212019    | 8/1990  | Japan ............................. 83/835 |
| 323055    | 5/1991  | Japan . |
| 2052374   | 1/1981  | United Kingdom ............. 83/835 |
| 8801215   | 2/1988  | WIPO ............................. 83/835 |

*Primary Examiner*—Eugenia Jones
*Attorney, Agent, or Firm*—Nikaido, Marmelstein, Murray & Oram LLP

[57] ABSTRACT

A disk-type cutting tool having a plurality of hardened inserts that are received in recesses formed in the periphery of a base disk. Each insert has a shank portion that is received in the recess and which defines a shoulder that is in abutting engagement with one side of the base disk. This provides a mechanical interlock and location for brazing operation, and also increases the amount of surface area for brazing to provide a more rigid assembly.

5 Claims, 7 Drawing Sheets

DISC CUTTER

This application is a continuation of application Ser. No. 08/361,211 filed Dec. 21, 1994 now abandoned.

BACKGROUND OF THE INVENTION

This invention relates to a disk cutter, and more particularly to an improved disk cutter of the type having separate hardened cutting inserts affixed to a disk-shaped metal base that is adapted to be affixed to and driven by a tool.

There is a popular type of disk cutter that is comprised of a base disk having a plurality of recesses in which hardened cutting tip inserts are affixed, as by brazing. The base disk has a plurality of circumferentially spaced slots, and the cutter inserts have shank portions that are received in and affixed to these slots by brazing or the like.

There are certain disadvantages with this type of construction, particularly in the ability to locate the cutting inserts accurately in an axial direction, and this may be best understood by reference to FIGS. 1 and 2 which are, respectively, side and end views of a disk cutter constructed in accordance with a conventional prior art type of construction. The cutter disk is indicated generally by the reference numeral 21 and is comprised of a base disk 22 having a plurality of serrated tip supports 23, each of which is formed with a respective cutter receiving groove 24.

The grooves 24 are configured so that they taper inwardly in a radially outward direction. A plurality of hardened cutter tip inserts 25 are provided which have individual shank portions 25a that are shaped complementary to and received in the grooves 24. The extending outer peripheral edges of these inserts 25 form cutting tips 25b.

As may be seen in FIG. 2, the thickness T1 of the base 22 is less than the thickness T2 of the cutting tool inserts 25. As a result of this, a portion of each cutting tool insert 25 will extend transversely outwardly in an axial direction relative to the base disk 22. The base disk 22 is affixed to a suitable tool and is rotatably driven in direction shown by the arrow 26 in FIG. 1. The axial direction refers to the direction of the axis around which the cutter disk 21 rotates.

As may be seen in FIG. 2, it is the conventional practice to stagger the inserts 25 relative to the base disk 24 so that the difference in width T2 minus T1 (T2−T1) of the individual inserts 25 are staggered, progressing circumferentially around the base disk 22. The inserts 25 are affixed as by brazing along this extending surface.

As should be readily apparent, this manner of assembly requires holding of the insert piece 25 in an axial direction relative to the base disk 22 during the brazing process. This is difficult to maintain, and as a result, the cutting edges 25b of the inserts may be staggered along the circumference of the cutter, and this is not desirable. In addition, the area along which the braze can be formed is limited to the actual length of the slots 24 and the corresponding surfaces of the insert pieces 25. This does not offer high strength brazing, and frequently the insert pieces may be dislodged. For example, if the cutter disk 25 is used in a mowing machine and small stones strike the tips 25, they may be dislodged from the slots 24.

It is, therefore, a principal object of this invention to provide an improved disk cutter embodying separate insert pieces.

It is a further object of this invention to provide an improved disk cutter having insert pieces arranged in such a way that the insert pieces can be accurately located when attached to the base disk and also wherein a large bonding area can be provided.

It is a further object of this invention to provide an improved cutting disk of this type wherein the insert pieces are configured relative to the base disk in such a way that impacts on the inserts during cutting operations will not tend to disturb the bond between the inserts and the base disk.

SUMMARY OF THE INVENTION

This invention is adapted to be embodied in a cutting tool that is comprised of an annular disk-shaped base that is adapted to be affixed to and driven by an associated tool. The base has a peripheral edge with a plurality of tool receiving recesses formed therein. A plurality of hardened cutting tool inserts, each having a cutting edge and a shank part, are provided with the shank parts being received in respect of the recesses. The shank parts and the base peripheral edge define abutting surfaces that provide shoulder portions which are disposed at an angle to the recesses so as to provide a larger effective area for attachment.

DETAILED DESCRIPTION OF THE PREFERRED EMBODIMENTS OF THE INVENTION

Figure 1:
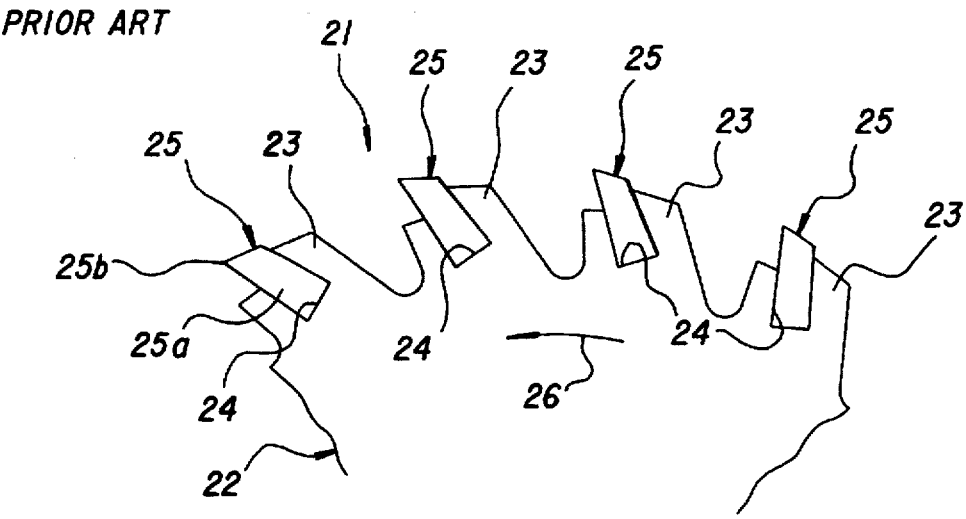
FIG. 1 is a partial side elevational view of a disk cutter constructed in accordance with a prior art type of arrangement.
Figure 2:
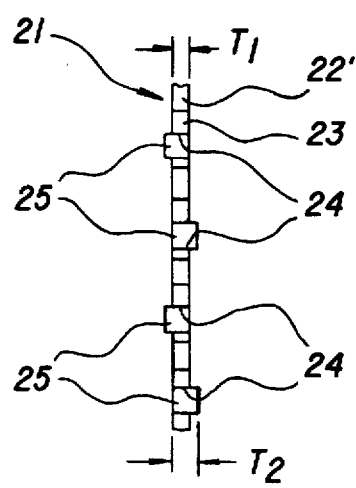
FIG. 2 is an end elevational view of the prior art type of disk cutter.

A disk cutter constructed in accordance with a first embodiment of the invention is identified generally by the reference numeral 51 and is shown in FIGS. 3–9. The disk cutter 51 is comprised of a base 52 that is adapted to be affixed for rotation with a suitable tool in the direction of the arrow 54 shown in FIG. 3. The base 52 is formed from a suitable material, such as a steel comprised of either an alloy tool steel such as JIS-SK S51 or carbon steel such as JIS-SK 5. Of course, the materials chosen will be those necessary to suit the particular application for which the cutter disk 51 is employed, and this selection is well within the scope of those skilled in the art.

Figure 9:
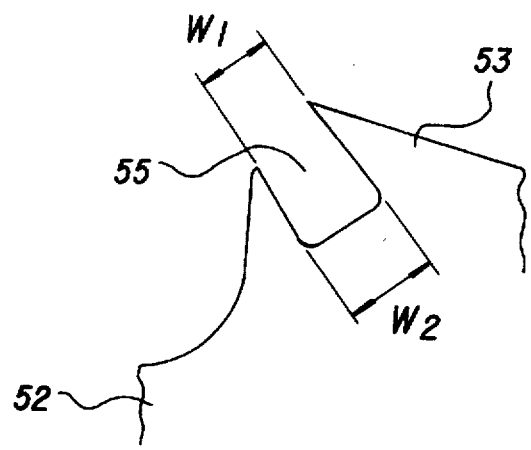
FIG. 9 is a view showing the individual tip support before the insert is installed and looking in the same direction as FIG. 4.

The base disk 52 has a plurality of circumferentially extending cutting insert receiving tips 53, each of which is formed with a respective tool receiving recess 55. The recesses 55 are configured so that they taper inwardly in a radially outward direction, as best seen in FIG. 9. That is, the width W2 at the base of the recess 55 is greater than the width W1 at the outer peripheral edge of the recess 55.

A plurality of individual hardened cutting inserts, indicated generally by the reference numeral 56, are provided, each of which is received within a respective one of the recesses 55. The cutter inserts 56 are formed from a hard material, such as a cemented carbide such as JIS-K 10 or JIS-K 20. Again, those skilled in the art will be able to determine the appropriate material consistent with the teaching of this invention.

Each insert 56 is provided with a respective insert shank portion 56a that is received within the respective groove 55 and a cutting tip portion 56b. The cutting tip portions 56b extend peripherally beyond the ends of the recesses 55 and beyond the tips of the tool receiving portions 53 of the base disk 52.

As with the prior art constructions, the width T2 of the insert pieces 56 is greater than the width T1 of the base disk 52. However, unlike the prior art types of construction, the insert shank portion 56a is provided with an outstanding flange on one side thereof which is abuttingly engaged with the side surface 53a of the tip receiving portions 53 of the base disk 52.

In this embodiment, this flange includes a pair of side surfaces 56c and a base surface 56d that is integrally connected with the side surfaces 56c. This provides a shoulder 57 that engages the surface 53a of the tip supports 53 of the base disk 52. Thus, this provides not only a significantly greater area along which the inserts 56 may be brazed to the base disk 52 by a brazing process such as silver brazing, but also offers a mechanical resistance to separation of the braze when an object is struck during the cutting operation.

Figure 3:
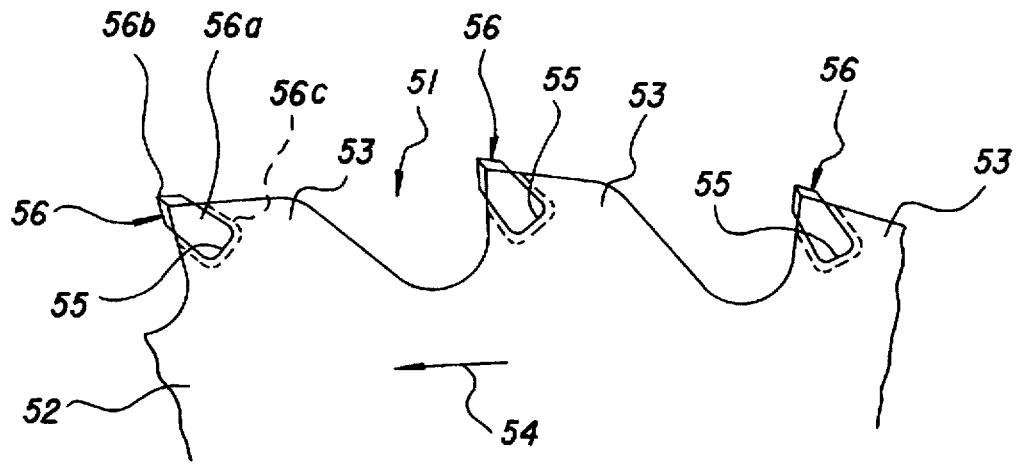
FIG. 3 is an enlarged partial side elevational view of a disk cutter constructed in accordance with a first embodiment of the invention.
Figure 4:
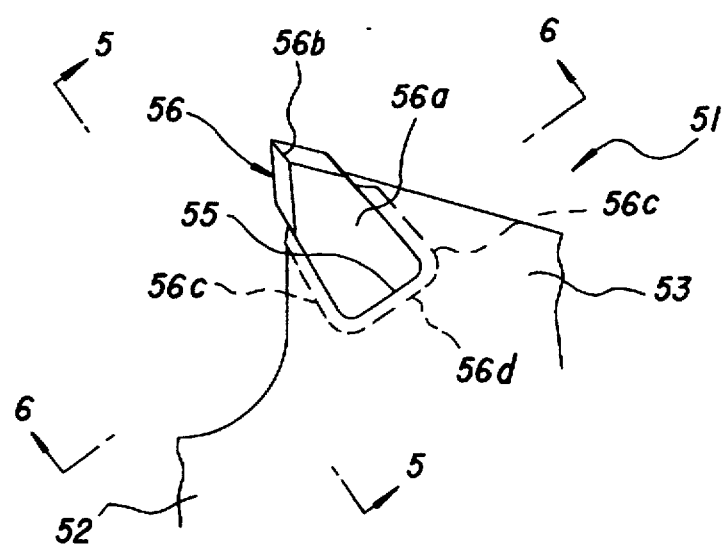
FIG. 4 is a further enlarged side elevational view showing one of the cutter inserts and the way in which it cooperates with the corresponding portion of the base disk.
Figure 5:
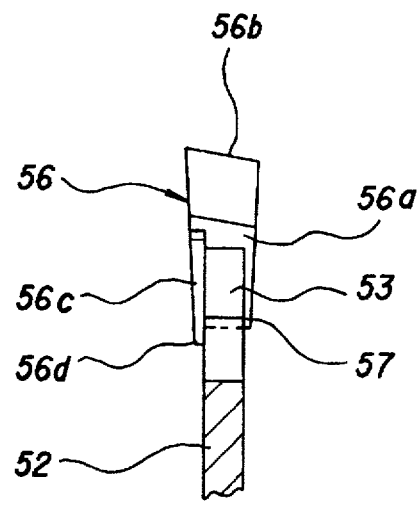
FIG. 5 is a cross-sectional view taken along the line 5—5 of FIG. 4.
Figure 6:
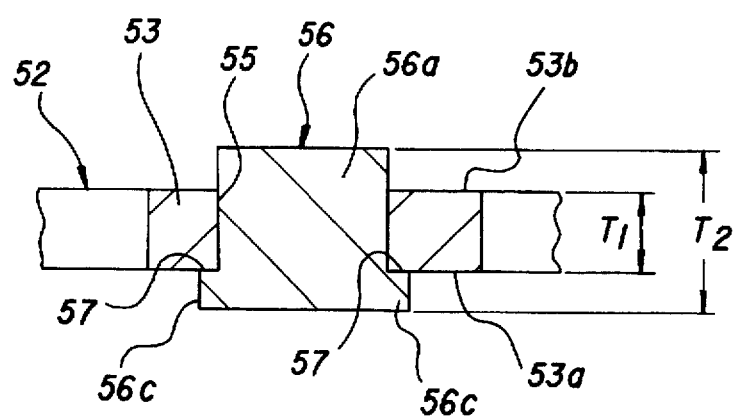
FIG. 6 is an enlarged cross-sectional view taken along the line 6—6 of FIG. 4.
Figure 7:
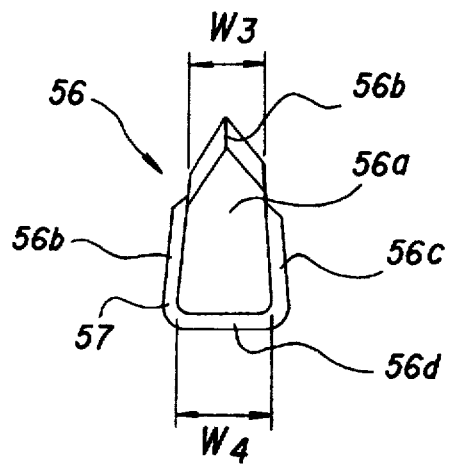
FIG. 7 is a view showing the individual cutting inserts looking in the same direction as FIG. 4.
Figure 8:
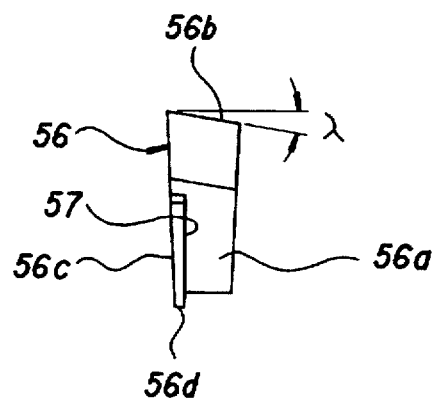
FIG. 8 is a side elevational view of the cutter inserts looking in the same direction as FIG. 5.

FIGS. 3 and 4 are top views of the cutting tool, and FIG. 6 shows how it is positioned in actual cutting operation when used as a mower disk. Hence, any object struck will be on the underside, and if they strike the insert pieces 56, the shoulder 57 of the insert piece will engage the surface 53a of the base disk 52 and resist loading of the braze.

In addition, this construction provides an extension of the insert base 56a beyond the opposite side surface 53b (FIG. 6) of the base disk portion 53, and thus affords a further area for brazing. Hence, the construction provides a much greater brazing surface area than with the prior art types of construction, and in addition provides a mechanical interlock against impact loads.

It should be noted from the figures that the cutting edge 56b of the inserts 56 has a relief angle λ that is disposed on the side opposite the shoulder forming flanges 56c, d. This is a result of the mounting of the tool for cutting in the manner described so that the flanges 56c, d are formed to lie on the feed side of the cutter 51.

Figure 10:
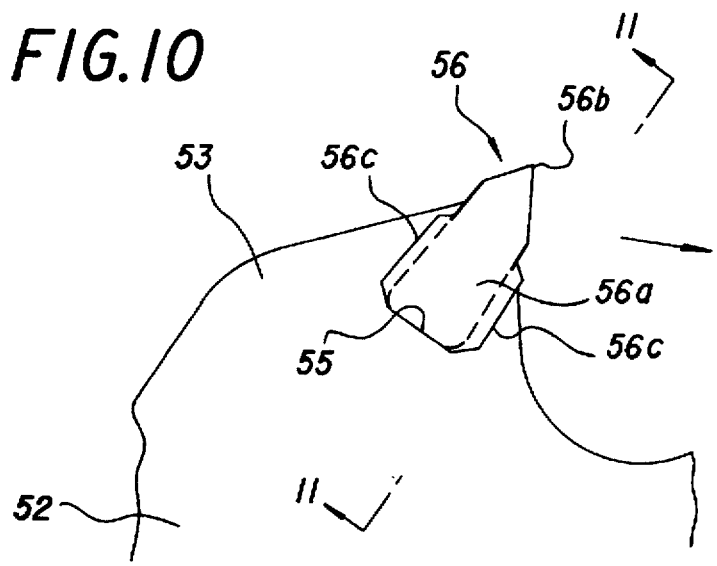
FIG. 10 is an enlarged side elevational view looking in a direction opposite to that of FIGS. 3 and 4 and shows another embodiment of the invention.
Figure 11:
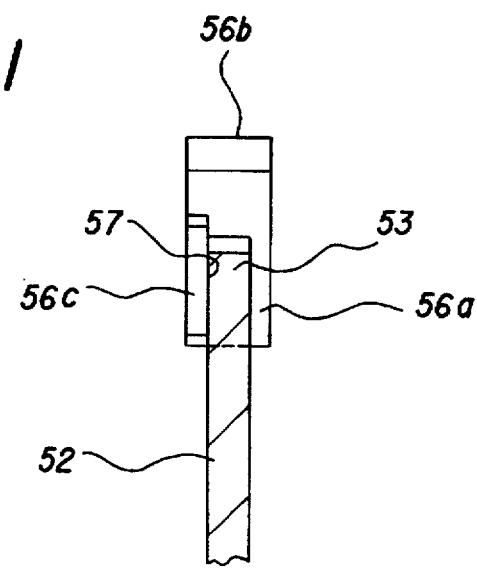
FIG. 11 is a cross-sectional view of this embodiment taken along the line 11—11 of FIG. 10.

FIGS. 10 and 11 show another embodiment of the invention which is basically the same as the embodiment of FIGS. 3–9, and for that reason, components of this embodiment which are the same as the embodiment previously described have been identified by the same reference numerals and will not be described again. This embodiment differs from the previous embodiment in eliminating the flange portion 56d at the base of the cutter insert 56. However, the flange portions 56c are still retained, and hence there is a large area for brazing. In addition, both sides of the insert can be brazed to the base disk 52. Because of the other similarities of the construction to that previously described, it is not believed necessary to describe this embodiment further.

Figure 12:
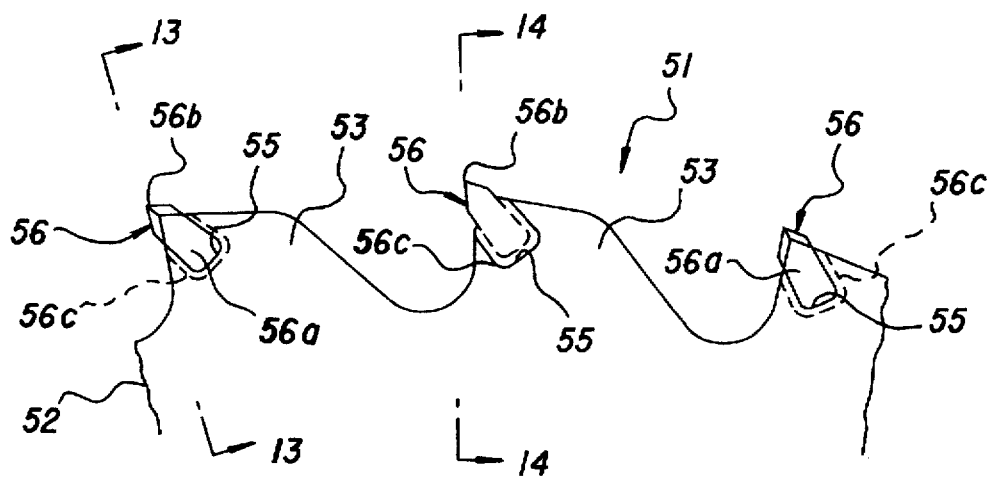
FIG. 12 is a partial side elevational view, in part similar to FIG. 3, and shows a third embodiment of the invention.
Figure 13:
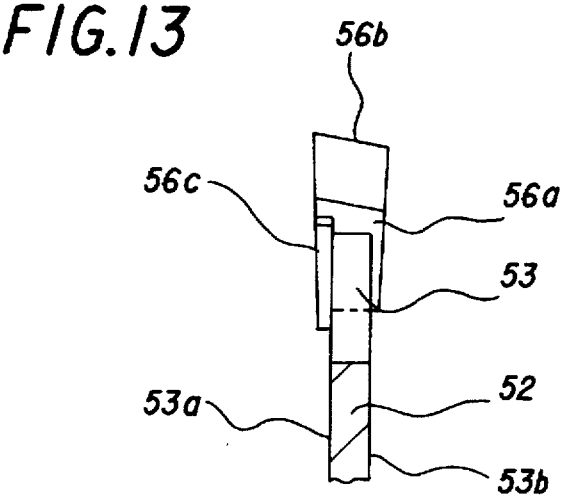
FIG. 13 is a cross-sectional view taken along the line 13—13 of FIG. 12.
Figure 14:
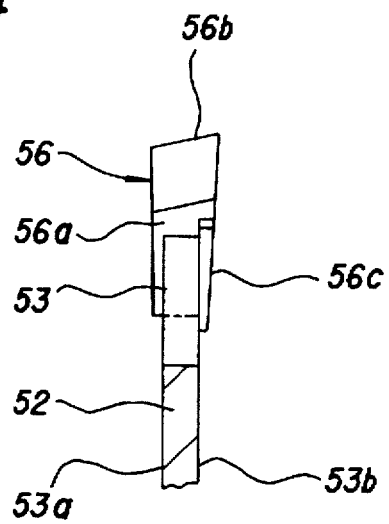
FIG. 14 is a cross-sectional view taken along the line 14—14 of FIG. 12.

FIGS. 12–14 show another embodiment of the invention, and in this embodiment the base disk 52 and the inserts 56 have the same construction as shown in the embodiment of FIGS. 5–9. However, in this embodiment alternate inserts 56 are disposed so that their flange portions 56c and 56d engage alternate of the disk surfaces 53a and 53b, as clearly shown in FIGS. 13 and 14. Because of this similarity, it is believed that further description of this embodiment is not necessary to permit those skilled in the art to practice the invention. Also, it should be understood that this insert and disk construction can be employed using the configurations of the inserts shown in FIGS. 10 and 11.

Figure 15:
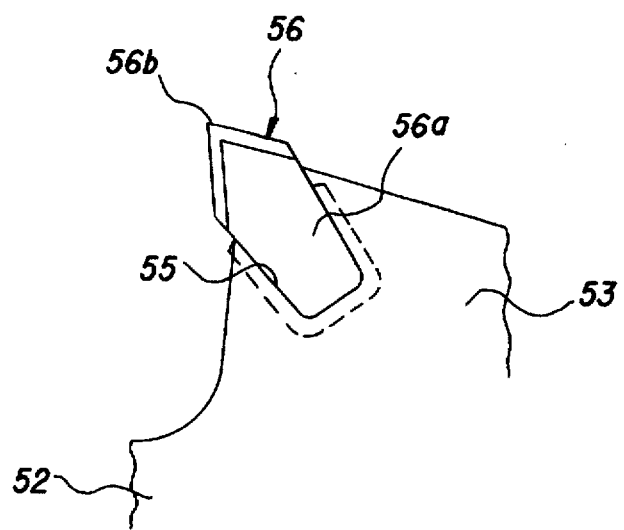
FIG. 15 is a side elevational view, in part similar to FIGS. 4, 10, and 12, and shows a fourth embodiment of the invention.

FIG. 15 shows an embodiment of the invention which is the same as the previously described embodiments, but in this embodiment the tool receiving recesses 55 of the base disk 52 are not tapered inwardly in a radially outward direction. Rather, the taper is in the opposite sense, as clearly seen in FIG. 15. This arrangement may be employed with any of the types of flange construction previously described, and for that reason, further description of this embodiment is not believed to be necessary.

In all of the embodiments described, the shoulder between the insert pieces 56 and the base disk 52 has been provided by a flange of the insert piece 56 that engages a peripheral outer surface of the base disk 52. It should be understood that this shoulder arrangement may be also employed by forming a recessed slot around the tool receiving recesses of the base disk on one or alternate sides thereof. This will provide the same advantages, but has the disadvantage of requiring further machining operations.

It should be readily apparent from the foregoing description that the described embodiments of the invention are very effective in providing extremely rigid cutting disks that employ insert pieces and wherein the insert pieces are not likely to become dislodged in operation. Also the assembly method is simplified and alignment assured. Of course, the foregoing description is that of preferred embodiments of the invention, and various changes and modifications may be made without departing from the spirit and scope of the invention as defined by the appended claims.

I claim:

1. A cutting tool comprising:
    an annular disk-shaped base adapted to be driven about an axis of rotation, said base having a peripheral edge with a plurality of tool receiving recesses formed therein, each recess being defined by at least two surface portions extending across an axial width of said peripheral edge, each recess tapering inwardly in a radially outward direction;
    a plurality of hardened cutting tool inserts fixed to said base at the recesses, each cutting tool insert having a cutting edge and a shank part received in a respective one of the recesses, each of said shank parts having first and second flanges integrally formed therewith on only one axial side of said shank part extending in a forward and a rearward direction, respectively, with respect to a rotational direction of the cutting tool, each of said first and second flanges defining an engaging shoulder portion extending in a plane substantially perpendicular to the axis and adjacent at least one side of each of said surface portions, each engaging shoulder portion engaging with one side surface of said base, each of said cutting tool inserts being fixed to said base at each of said engaging shoulder portions wherein said cutting edge of each of said cutting tool inserts has a relief angle extending in a direction away from said one side of said insert having said first and second flanges.

2. A cutting tool as in claim 1, wherein each of said shank parts further includes a third flange on said one side of said shank part extending radially inwardly beyond each recess, each of said third flanges defining another engaging shoulder portion engaging with the one side surface of said base.

3. A cutting tool as in claim 1, wherein said engaging shoulder portions are all disposed on the same axial side of said base.

4. A cutting tool as in claim 1, wherein an axial width of said shank part is such that said shank part extends axially beyond peripheral side edges of the tool receiving recesses of said base on both axial sides thereof.

5. A cutting tool as in claim 1, wherein the engaging shoulder portions of circumferentially adjacent cutting tool inserts lie on alternate axial sides of said base circumferentially around said base.

* * * * *